United States Patent
Gou et al.

(10) Patent No.: US 10,948,417 B2
(45) Date of Patent: Mar. 16, 2021

(54) METHOD FOR IDENTIFYING RAMAN SPECTROGRAM AND ELECTRONIC APPARATUS

(71) Applicant: Nuctech Company Limited, Beijing (CN)

(72) Inventors: Wei Gou, Beijing (CN); Jiaqian Zuo, Beijing (CN); Rui Fan, Beijing (CN)

(73) Assignee: Nuctech Company Limited, Beijing (CN)

(*) Notice: Subject to any disclaimer, the term of this patent is extended or adjusted under 35 U.S.C. 154(b) by 143 days.

(21) Appl. No.: 16/473,505

(22) PCT Filed: Nov. 24, 2017

(86) PCT No.: PCT/CN2017/112915
§ 371 (c)(1),
(2) Date: Jun. 25, 2019

(87) PCT Pub. No.: WO2018/121151
PCT Pub. Date: Jul. 5, 2018

(65) Prior Publication Data
US 2019/0331604 A1    Oct. 31, 2019

(30) Foreign Application Priority Data

Dec. 26, 2016   (CN) .......................... 201611222588.0

(51) Int. Cl.
*G01N 21/65*        (2006.01)
*G01J 3/02*         (2006.01)
(Continued)

(52) U.S. Cl.
CPC ............ *G01N 21/65* (2013.01); *G01J 3/0208* (2013.01); *G01J 3/44* (2013.01); *G06K 9/00* (2013.01)

(58) Field of Classification Search
CPC .......... G01N 21/65; G01J 3/0208; G01J 3/44; G06K 9/00
See application file for complete search history.

(56) References Cited

U.S. PATENT DOCUMENTS 7,983,852 B2 * 7/2011 Wright ............... G01N 30/8624
                                            702/32
2010/0104205 A1   4/2010 Gosian
(Continued)

FOREIGN PATENT DOCUMENTS

CN        101285773 A      10/2008
CN        101303305 A      11/2008
(Continued)

OTHER PUBLICATIONS

"International Application Serial No. PCT/CN2017/112915, International Search Report dated Feb. 26, 2018", w/ English Translation, (dated Feb. 26, 2018), 7 pgs.
(Continued)

Primary Examiner — Maurice C Smith
(74) Attorney, Agent, or Firm — Schwegman Lundberg & Woessner, P.A.

(57) ABSTRACT

The disclosure provides a method for identifying a Raman spectrum and an electronic apparatus. The method includes steps of: measuring a Raman spectrum of a substance to be detected so as to obtain a measured spectrogram, the measured spectrogram including a series of data; extracting peak information of the measured spectrogram, the peak information including a peak intensity, a peak position and a peak area; comparing the peak information of the measured spectrogram with peak information of a prestored standard spectrogram so as to identify whether or not the peak information of the measured spectrogram matches the peak information of the standard spectrogram; and comparing, when identifying that the peak information of the measured
(Continued)

spectrogram matches the peak information of the standard spectrogram, data of the measured spectrogram with data of the prestored standard spectrogram, so as to further identify whether or not the measured spectrogram matches the standard spectrogram.

12 Claims, 4 Drawing Sheets

(51) Int. Cl.
*G01J 3/44* (2006.01)
*G06K 9/00* (2006.01)

(56) References Cited

U.S. PATENT DOCUMENTS

| | | | |
|---|---|---|---|
| 2015/0358189 A1 | 12/2015 | Doi | |
| 2016/0103070 A1* | 4/2016 | Kyoung | G01N 21/65 356/301 |

FOREIGN PATENT DOCUMENTS

| | | |
|---|---|---|
| CN | 103512877 A | 1/2014 |
| CN | 103955518 A | 7/2014 |
| CN | 104215623 A | 12/2014 |
| CN | 105300954 A | 2/2016 |
| CN | 106198482 A | 12/2016 |

OTHER PUBLICATIONS

"International Application Serial No. PCT/CN2017/112915, Written Opinion dated Feb. 26, 2018", w/ English Translation, (dated Feb. 26, 2018), 10 pgs.

"European Application Serial No. 17888822.8, Extended European Search Report dated Jul. 27, 2020", (dated Jul. 27, 2020), 10 pgs.

Harris, Andrew T., et al., "Potential for Raman spectroscopy to provide cancer screening using a peripheral blood sample", Head & neck oncology 1.1, (2009), 34.

Rubina, S., et al., "Raman spectroscopic study on classification of cervical cell specimens", Vibrational Spectroscopy 68, (2013), 115-121.

Ullah, Irfan, et al., "Computer assisted optical screening of human ovarian cancer using Raman spectroscopy", Photodiagnosis and photodynamic therapy 15, (2016), 94-99.

"Chinese Application No. 201611222588.0, Office Action dated Apr. 13, 2020", w/ English Translation, (dated Apr. 13, 2020), 17 pgs.

Axelsson, Maria, et al., "Detection and classification of explosive substances in multi-spectral image sequences using linear subspace matching", 2013 IEEE International Conference on Acoustics, Speech and Signal Processing. IEEE, (Oct. 21, 2013), 3492-3496.

\* cited by examiner

METHOD FOR IDENTIFYING RAMAN SPECTROGRAM AND ELECTRONIC APPARATUS

PRIORITY APPLICATIONS

This application is a U.S. National Stage Filing under 35 U.S.C. 371 from International Application No. PCT/CN2017/112915, filed on Nov. 24, 2017, and published as WO2018/121151 on Jul. 5, 2018, which claims the benefit of priority to Chinese Application No. 201611222588.0, filed on Dec. 26, 2016; the benefit of priority of each of which is hereby claimed herein, and which applications and publication are hereby incorporated herein by reference in their entirety.

FIELD OF THE DISCLOSURE

The present disclosure generally relates to the field of spectrogram analyzing and processing technologies, and in particular to a method for identifying a Raman spectrogram, and an electronic apparatus.

DESCRIPTION OF THE RELATED ART

Raman spectrum is a molecular vibration spectrum that can reflect the fingerprint characteristics of molecules, and can be used for the inspection of substance. Raman spectrum detection can inspect and identify the substance by the Raman spectrum generated from the Raman scattering effect of the inspected substance with respect to exciting light. Raman spectrum detection technology has been widely used in the fields of liquid detection, jewelry detection, explosive detection, drug detection, pesticide detection and the like.

When analyzing and processing a spectrogram of the Raman spectrum, a problem to be often faced is how to effectively and quickly determine whether or not a Raman spectrogram of the inspected substance matches a standard spectrogram.

The existing Raman spectrogram modeling method usually selects the data information of the spectrogram for modeling directly, and then matches the Raman spectrogram of the detected substance with the standard Raman spectrogram in a standard library, which not only has a low recognition rate, but also has a relatively higher computing time. And can not reflect the advantages of Raman recognition.

SUMMARY

According to an aspect of the present disclosure, there is provided a method of identifying a Raman spectrogram, comprising:

a measured spectrogram obtaining step: measuring a Raman spectrum of a substance to be detected so as to obtain a measured spectrogram, the measured spectrogram including a series of data;

a peak information extraction step: extracting peak information of the measured spectrogram, the peak information including a peak intensity, a peak position and a peak area;

a first identifying step: comparing the peak information of the measured spectrogram with peak information of a prestored standard spectrogram so as to identify whether or not the peak information of the measured spectrogram matches the peak information of the standard spectrogram; and a second identifying step: comparing, when identifying in the first identifying step that the peak information of the measured spectrogram matches the peak information of the standard spectrogram, data of the measured spectrogram with data of the prestored standard spectrogram, so as to further identify whether or not the measured spectrogram matches the standard spectrogram.

According to some embodiments, the first identifying step comprises:

an ordering step: ordering peaks of the measured spectrogram and peaks of the standard spectrogram in a descend order of a peak intensity respectively, so as to select first ordered N peaks of the measured spectrogram and the standard spectrogram;

a comparing step: comparing peak position information between the first ordered N peaks of the measured spectrogram and the standard spectrogram; and a first matching step: determining whether or not the peak information of the measured spectrogram matches the peak information of the standard spectrogram based on a comparison result obtained in the comparing step.

According to some embodiments, the comparing peak position information between the first ordered N peaks of the measured spectrogram and the standard spectrogram in the comparing step specifically comprises:

calculating absolute differences between peak positions of each of the first ordered N peaks of the measured spectrogram and peak position of each of the first ordered N peaks of the standard spectrogram in order in accordance with the following formula (1):

$$pD=|p2[j].fPos-p1[i].fPos| \qquad \text{formula (1)},$$

where, N is a predetermined number of compared peaks and is a natural number larger than or equal to 3;

j represent order numbers of ordered peaks of the standard spectrogram and the measured spectrogram respectively, and i and j are each an integer larger than or equal to 0 and smaller than or equal to N;

$p1[i].fPos$ represents a peak position of the $i^{th}$ peak of the ordered peaks of the standard spectrogram;

$p2[j].fPos$ represents a peak position of the $j^{th}$ peak of the ordered peaks of the measured spectrogram; and pD represents an absolute difference between peak positions.

According to some embodiments, the first matching step comprises:

determining that the peak information of the measured spectrogram matches the peak information of the standard spectrogram when the calculated absolute difference between the peak positions meets the following condition (1); and determining that the peak information of the measured spectrogram does not match the peak information of the standard spectrogram when the calculated absolute difference between the peak positions does not meet the following condition (1):

$$pD<p2[j].fWidth/3 \text{ and } pD<p1[i].fWidth/3 \qquad \text{condition (1)},$$

where, $p1[i].fWidth$ represents a peak width of the ordered $i^{th}$ peak of the standard spectrogram; and $p2[j].fWidth$ represents a peak width of the ordered $j^{th}$ peak of the measured.

According to some embodiments, the first identifying step further comprises:

a peak matching weight calculation step: establishing a penalty function in accordance with the following formula (2) so as to calculate a peak matching weight; and a second matching step: determining that the peak information of the measured spectrogram matches the peak information of the standard spectrogram when peak matching weight is larger than or equal to a weight threshold; and determining that the peak information of the measured spectrogram does not match the peak information of the standard spectrogram when peak matching weight is smaller than the weight threshold, $$h=(1-2*|j-i|/10)*(0.5/(i+1))*\exp(-pD*2/\min(p1[i].fWidth,p2[j].fWidth)) \quad \text{formula (2),}$$

where:

h represents a peak matching weight;

i, j represent order numbers of ordered peaks of the standard spectrogram and the measured spectrogram respectively, and i and j are each an integer larger than or equal to 0 and smaller than or equal to N;

N is a predetermined number of compared peaks and is a natural number larger than or equal to 3;

pD represents an absolute difference between peak positions;

p1[i].fWidth represents a peak width of the $i^{th}$ peak of the ordered peaks of the standard spectrogram; and p2[j].fWidth represents a peak width of the $j^{th}$ peak of the ordered peaks of the measured.

According to some embodiments, the peak matching weight calculation step and the second matching step are performed when determining that the peak information of the measured spectrogram matches the peak information of the standard spectrogram in the first matching step.

According to some embodiments, N is a natural number larger than or equal to three and smaller than or equal to five.

According to some embodiments, the second identifying step comprises:

comparing in correlation between data of the measured and data of the prestored standard spectrogram.

According to some embodiments, the comparing in correlation between data of the measured and data of the prestored standard spectrogram comprises:

calculating a correlation coefficient between the data of the measured and the data of the prestored standard spectrogram;

determining that the measured spectrogram matches the standard spectrogram when the calculated correlation coefficient is larger than or equal to a preset correlation threshold; and determining that the measured spectrogram does not matches the standard spectrogram when the calculated correlation coefficient is less than the preset correlation threshold.

According to some embodiments, the step of comparing in correlation between data of the measured and data of the prestored standard spectrogram is performed within a union section between peak areas of all of peaks of the measured spectrogram and the standard spectrogram.

According to some embodiments, the method further comprises: a normalization step: normalizing the measured spectrogram and the standard spectrogram;

wherein the normalization step is performed before the peak information extraction step.

According to a further aspect of the present disclosure, there is also provided an electronic apparatus, comprising:

a memory for storing executable instructions therein; and a processor configured to execute the executable instructions stored in the memory to perform the method described in any one of aspects of embodiments of the present disclosure.

DETAILED DESCRIPTION OF THE EMBODIMENTS

Technical solutions of the present disclosure will be described hereinafter in more detail by the way of embodiments with reference to the accompanying drawings. The same or similar reference numerals refer to the same or similar elements throughout the description. The description of the embodiments of the present disclosure made with reference to the accompanying drawings is intended to interpret the general inventive concept of the present disclosure, rather than being construed as a limiting to the present disclosure.

In this text, for purpose of description, phrases such as "first, "second", "A, B, C" and the like are used to describe steps in a method, but unless otherwise specified, such phrases should not be construed as a limiting to a sequence of performing the steps.

Figure 1:
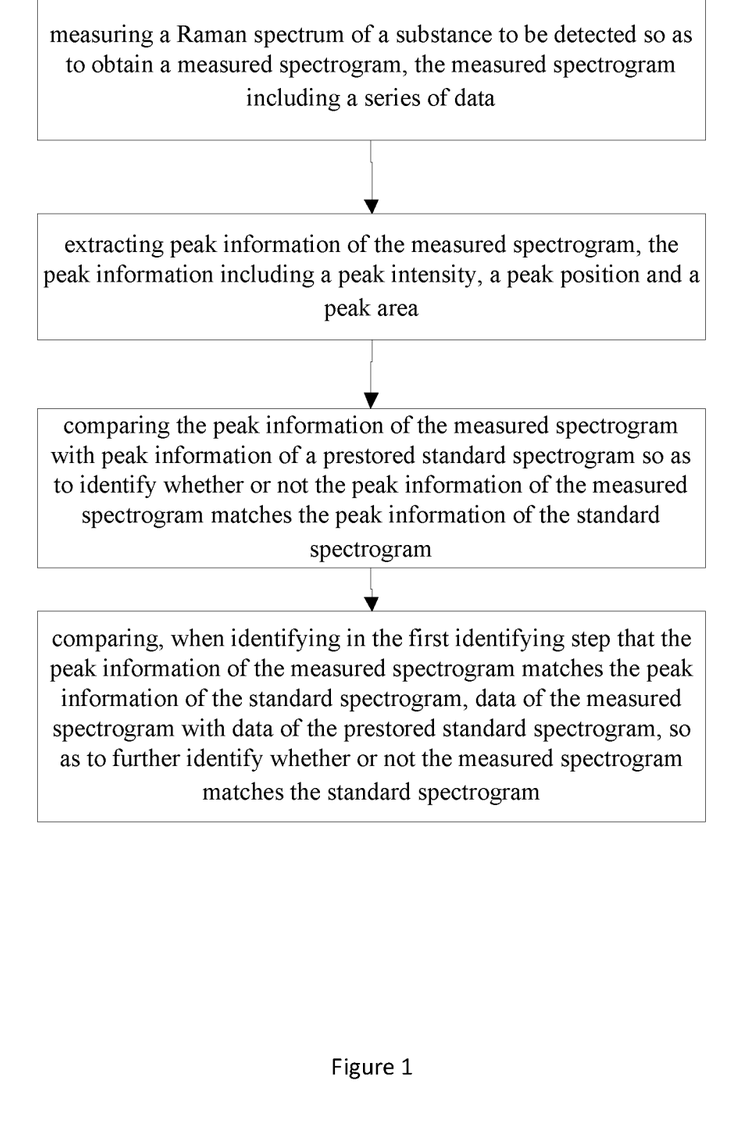
FIG. 1 is a flow chart schematically showing a method for identifying a Raman spectrogram according to an embodiment of the present disclosure.

FIG. 1 schematically shows a method for identifying a Raman spectrogram according to an exemplary embodiment of the present disclosure. As shown in FIG. 1, the method may comprise:

a measured spectrogram obtaining step: measuring a Raman spectrum of a substance to be detected so as to obtain a measured spectrogram, the measured spectrogram including a series of data;

a peak information extraction step: extracting peak information of the measured spectrogram, the peak information including a peak intensity, a peak position and a peak area;

a first identifying step: comparing the peak information of the measured spectrogram with peak information of a prestored standard spectrogram so as to identify whether or not the peak information of the measured spectrogram matches the peak information of the standard spectrogram; and a second identifying step: comparing, when identifying in the first identifying step that the peak information of the measured spectrogram matches the peak information of the standard spectrogram, data of the measured spectrogram with data of the prestored standard spectrogram, so as to further identify whether or not the measured spectrogram matches the standard spectrogram.

In embodiments of the present disclosure, before comparing data of the measured spectrogram and data of the prestored standard spectrogram, that is, before the second identifying step, the first identifying step is performed, that is, the peak information of the measured spectrogram is compared with peak information of a prestored standard spectrogram. The second identifying step will be performed only when it is determined in the first identifying step that the peak information of the measured spectrogram matches the peak information of the standard spectrogram; if it is determined in the first identifying step that the peak information of the measured spectrogram does not match the peak information of the standard spectrogram, it can be directly determined, without performing the second identifying step, that the measured spectrogram does not match the standard spectrogram. As such, by comparing the peak information, an initial screening and selecting effect could be achieved. Further, compared to data of the whole section of the Raman spectrogram, the amount of data of the peak information is much small, and accordingly a calculation amount of comparing the peak information will be greatly reduced. Thus, by providing the first identifying step, the calculation amount can be greatly reduced, thereby increasing an identifying speed and improving an identifying accuracy.

Further, the above method may further comprise a normalization step: normalizing the measured spectrogram and the standard spectrogram. In an embodiment, the normalization step is performed before the peak information extraction step.

Specifically, if horizontal ordinates of the measured spectrogram do not correspond to those of the standard spectrogram, that is, the measured spectrogram include intensity data which are located at a Raman shift position different from the standard spectrogram, then intensity data at other Raman shift positions may be firstly calculated through interpolation calculation based on raw data of the measured spectrogram and the standard spectrogram, thereby transforming the measured spectrogram and the standard spectrogram so that they are located at a same Raman shift position. For example, in an example, the Raman shift position may be set as [350: 2: 2800] $cm^{-1}$, where, 350 $cm^{-1}$ and 2800 $cm^{-1}$ represent minimum and maximum Raman shift positions respectively, "2" represents an interval step length, that is, respective Raman shift positions are 350 $cm^{-1}$, 352 $cm^{-1}$, 354 $cm^{-1}$, 356 $cm^{-1}$, and so on, until 2800 $cm^{-1}$; then, if the raw data of the measured spectrogram and the standard spectrogram do not include intensity data at those Raman shift positions, the intensity data at those Raman shift position may be calculated through interpolation calculation based on the raw data of the measured spectrogram and the standard spectrogram, thereby the measured spectrogram and the standard spectrogram are transformed so that they are located at a same Raman shift position [350: 2: 2800] $cm^{-1}$, and the transformed measured spectrogram and standard spectrogram are referred to as measured spectrograms A', B' respectively. Further, if longitudinal coordinates of the measured spectrogram do not correspond to those of the standard spectrogram, that is, the intensity data of the measured spectrogram and the intensity data of the standard spectrogram are not located in a same reference system or are measured in different measurement ranges, the measured spectrogram A' may be transformed into the standard spectrogram B'. For example, in an example, maximum values, max (A') and max (B'), of the longitudinal coordinates of the measured spectrogram A' and B' may be selected respectively, and then a ratio of max (A') to max (B') may be used as a normalization coefficient of the longitudinal coordinates, such that discrete data of the measured spectrogram A' are multified by the normalization coefficient so that the measured spectrogram A' is transformed into the standard spectrogram B'. In other embodiments, the standard spectrogram may be kept being not changed, and rather, the measured spectrogram is directly normalized into the standard spectrogram.

In the below, before further describing the method for identifying a Raman spectrogram according to the embodiments of the present disclosure, the peak information of a Raman spectrogram will be described in detail with reference to the accompanying drawings.

Figure 2:
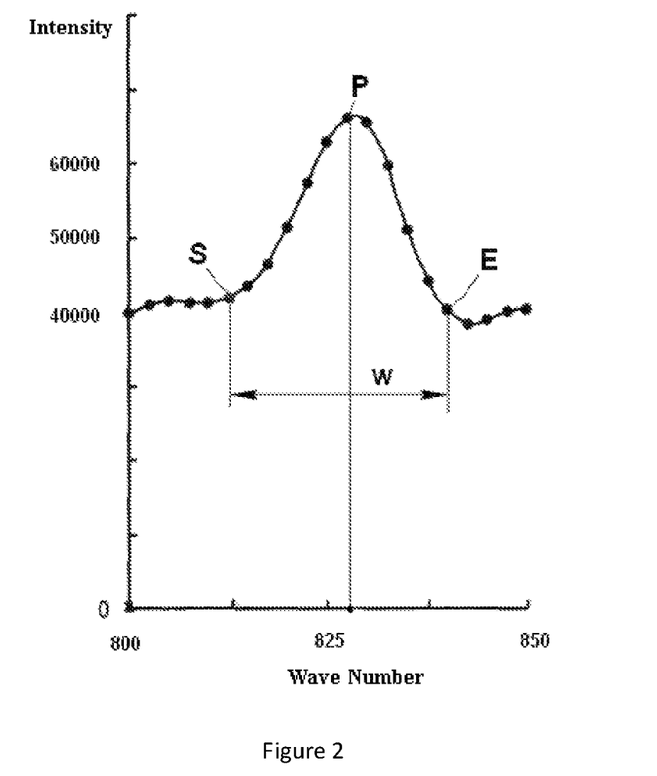
FIG. 2 schematically shows a peak of a Raman spectrogram of a substance.

FIG. 2 shows a peak of a Raman spectrogram of a substance. Peak information of the Raman spectrogram may include a peak area, a peak position, a starting point and an ending point, a peak width w, a peak intensity, or the like of a peak. Generally, a horizontal ordinate of the Raman spectrogram represents a Raman shift wave number (in a unit of $cm^{-1}$), while a longitudinal coordinate represents the intensity of the Raman spectrum (dimensionless or denoted by a.u.). When performing mathematical calculation, it may be considered that the Raman spectrogram includes a set of discrete data points, as denoted by black dots shown in FIG. 2, a horizontal ordinate of the data point may be referred to as a wave number, while a longitudinal coordinate of the data point may be referred to as an intensity value; that is, the Raman spectrogram includes a series of data, each of which may include a wave number and an intensity value corresponding to the wave. In this way, as shown in FIG. 2, the peak position may a position of a highest point P of the peak, that is, the wave number corresponding to the point "P"; the starting point and the ending point of the peak may be wave numbers corresponding to a starting point S and an ending point E of the peak respectively; the peak width w may be a width defined by the starting point S and the ending point E of the peak, that is, a difference between the wave number of the ending point E and the wave number of the starting point S of the peak; the peak area includes a section defined by the starting point S and the ending point E of the peak; and the peak intensity may be represented by an intensity value at the highest point P of the peak.

Hereinafter, a method for identifying a Raman spectrogram according to an embodiment of the present disclosure will be described in detail with reference to FIG. 3.

A method for identifying a Raman spectrogram according to an embodiment of the present disclosure may comprise:

a measured spectrogram obtaining step: measuring a Raman spectrum of a substance to be detected so as to obtain a measured spectrogram, the measured spectrogram including a series of data;

a peak information extraction step: extracting peak information of the measured spectrogram, the peak information including a peak intensity, a peak position and a peak area;

a first identifying step: comparing the peak information of the measured spectrogram with peak information of a prestored standard spectrogram so as to identify whether or not the peak information of the measured spectrogram matches the peak information of the standard spectrogram; and a second identifying step: comparing, when identifying in the first identifying step that the peak information of the measured spectrogram matches the peak information of the standard spectrogram, data of the measured spectrogram with data of the prestored standard spectrogram, so as to further identify whether or not the measured spectrogram matches the standard spectrogram.

Figure 3:
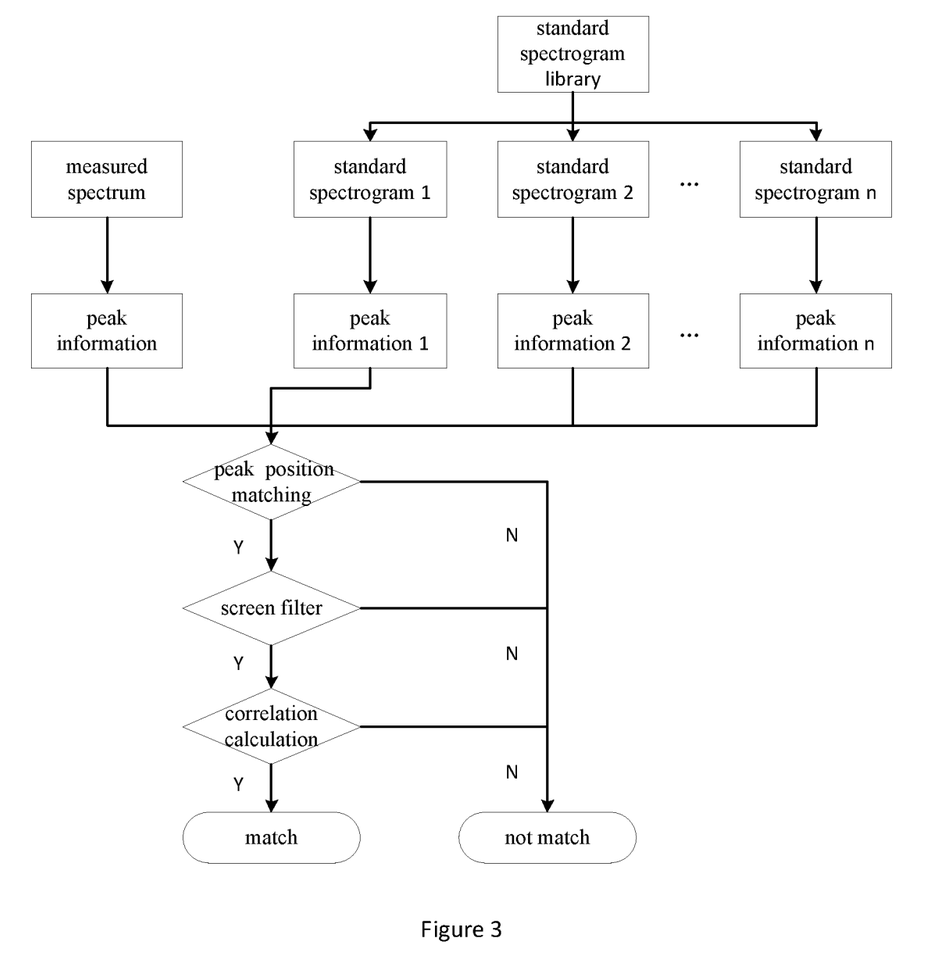
FIG. 3 is a flow chart schematically showing matching and identifying of a measured spectrogram and a standard spectrogram by using a method for identifying a Raman spectrogram according to an embodiment of the present disclosure.

As shown in FIG. 3, a standard spectrogram library prestores a plurality of standard spectrograms, for example, a standard spectrogram 1, a standard spectrogram 2, . . . a standard spectrogram n, and correspondingly, respective standard spectrograms include corresponding peak information 1, peak information 2, . . . peak information n.

According to embodiment of the present, as shown in FIG. 3, the first identifying step may further comprise a "peak position matching" step, which may include:

an ordering step: ordering peaks of the measured spectrogram and peaks of the standard spectrogram in a descend order of a peak intensity respectively, so as to select first ordered N peaks of the measured spectrogram and the standard spectrogram;

a comparing step: comparing peak position information between the first ordered N peaks of the measured spectrogram and the standard spectrogram; and a first matching step: determining whether or not the peak information of the measured spectrogram matches the peak information of the standard spectrogram based on a comparison result obtained in the comparing step.

According to some embodiments, the step of comparing peak position information between the first ordered N peaks of the measured spectrogram and the standard spectrogram in the comparing step may specifically include:

calculating absolute differences between peak positions of each of the first ordered N peaks of the measured spectrogram and peak position of each of the first ordered N peaks of the standard spectrogram in order in accordance with the following formula (1):

$$pD=|p2[j].fPos-p1[i].fPos| \quad \text{formula (1)},$$

where, N is a predetermined number of compared peaks and is a natural number larger than or equal to 3;

j represent order numbers of ordered peaks of the standard spectrogram and the measured spectrogram respectively, and i and j are each an integer larger than or equal to 0 and smaller than or equal to N;

p1[i].fPos represents a peak position of the $i^{th}$ peak of the ordered peaks of the standard spectrogram;

p2[j].fPos represents a peak position of the $j^{th}$ peak of the ordered peaks of the measured spectrogram; and pD represents an absolute difference between peak positions.

According to some embodiments, the first matching step may specifically include:

determining the peak information of the measured spectrogram matches the peak information of the standard spectrogram when the calculated absolute difference between the peak positions meets the following condition (1); and determining the peak information of the measured spectrogram does not match the peak information of the standard spectrogram when the calculated absolute difference between the peak positions does not meet the following condition (1):

$$pD<p2[j].fWidth/3 \; \text{且} \; pD<p1[i].fWidth/3 \quad \text{condition (1)},$$

where, p1[i].fWidth represents a peak width of the ordered $i^{th}$ peak of the standard spectrogram; and p2[j].fWidth represents a peak width of the ordered $j^{th}$ peak of the measured.

In an embodiment, N is a natural number larger than or equal to three and smaller than or equal to five. If the value of N is smaller, for example, if N is less than 3, the number of compared peaks is too small, which is not advantageous for screening and selecting a standard spectrogram having peak information corresponding to the peak information of the measured spectrogram, that is, not advantageous for identification validity; if the value of N is too large, it will increase a calculation amount for comparing the peak information and thereby may adversely affect a calculation speed for comparing the peak information. In case that N is a natural number larger than or equal to three and smaller than or equal to five natural number, both the validity and calculation speed of identifying the peak information will be taken in account.

Further, as shown in FIG. 3, the first identifying step may also include a "screen filter" step, which may specifically include:

a peak matching weight calculation step: establishing a penalty function in accordance with the following formula (2) so as to calculate a peak matching weight; and a second matching step: determining that the peak information of the measured spectrogram matches the peak information of the standard spectrogram when peak matching weight is larger than or equal to a weight threshold; and determining that the peak information of the measured spectrogram does not match the peak information of the standard spectrogram when peak matching weight is smaller than the weight threshold, $$h=(1-2*|j-i|/10)*(0.5/(i+1))*\exp(-pD*2/\min(p1[i].\text{Width},p2[j].f\text{Width})) \quad \text{formula (2)},$$

where:

h represents a peak matching weight;

"min(p1[i].fWidth,p2[j].fWidth)" represents a smaller one of the p1[i].fWidth and the p2[j].fWidth; and "exp" represents a power function with a base of natural logarithm of e.

In embodiments of the present disclosure, the peak matching weight calculation step and the second matching step are performed when determining that the peak information of the measured spectrogram matches the peak information of the standard spectrogram in the first matching step. In order words, in embodiments of the present disclosure, the calculation based on the penalty function and the comparing of peak matching weights will be performed only when it is determined in the first matching step that the absolute differences of the peaks meet requirements. Similarly, since the amount of calculation for the absolute differences of the peaks is less than the amount of calculation for the penalty function, a preliminary screening operation will be preformed through the calculation of the absolute differences of the peaks before the calculation of the penalty function, so that the amount of calculation can be greatly reduced, thereby improving speed and accuracy of identification.

According to an embodiment of the present disclosure, the second identifying step may include: comparing in correlation between data of the measured and data of the prestored standard spectrogram, as indicated by a "correlation calculation" step shown in FIG. 3.

In an embodiment, the step of comparing in correlation between data of the measured spectrogram and data of the prestored standard spectrogram comprises:

calculating a correlation coefficient between the data of the measured spectrogram and the data of the prestored standard spectrogram, determining the measured spectrogram matches standard spectrogram when the calculated correlation coefficient is larger than or equal to a preset correlation threshold; and determining the measured spectrogram does not match standard spectrogram when the calculated correlation coefficient is smaller than the preset correlation threshold.

Specifically, the correlation coefficient is a parameter for studying a linear correlation between variables and is used for determining a relationship between vectors. For example, there are feature vectors X (x1, x2, . . . , xn) and Y (y1, y2, . . . , yn), and a correlation coefficient r between them may be defined as follows:

$$r = \frac{\sum_{i=1}^{n}(x_i-\overline{x})(y_i-\overline{y})}{\sqrt{\sum_{i=1}^{n}(x_i-\overline{x})^2 \cdot \sum_{i=1}^{n}(y_i-\overline{y})^2}}$$

where, $\bar{x}$ and $\bar{y}$ represent mean values of the vectors X and Y respectively, and i represents i datum of the vector.

According to an embodiment of the present disclosure, the step of comparing in correlation between data of the measured spectrogram and data of the prestored standard spectrogram is performed within a union interval of peak areas of all of peaks of the measured spectrogram and the standard spectrogram. That is, the step of comparing in correlation between data of the measured spectrogram and data of the prestored standard spectrogram is not performed within the whole interval of the spectrogram, rather, is performed within a union interval of peak areas of all of peaks of the measured spectrogram and the standard spectrogram. The "union interval of peak areas of all of peaks of the measured spectrogram and the standard spectrogram" herein represents an interval consisted of peak areas of all of peaks of the measured spectrogram and the standard spectrogram. As such, the amount of data that needs to be compared for correlation can be further reduced, thereby further increasing the operation speed and ensuring the accuracy of the calculation.

In embodiments of the present disclosure, the measured spectrogram and the standard spectrograms are initially screened by comparing a local feature (the "peak"), by using the peak information of the spectrograms. After the initial screening, the global comparison of data of the spectrograms is performed. This can not only greatly shorten the matching and identifying time, but also improve the accuracy of matching and identifying. Moreover, in the "peak position matching" and "screen filter" steps shown FIG. 3, if it is determined that the peak information of the measured spectrogram does not match the peak information of the standard spectrogram, the matching process is terminated immediately without the need for a subsequent matching and identifying process, which can greatly improve the calculation speed when determining the mismatch therebetween. The test proves that the matching and identifying time is shortened to be about 5% of a conventional method, and the accuracy of the matching recognition is improved by 10%.

Figure 4:
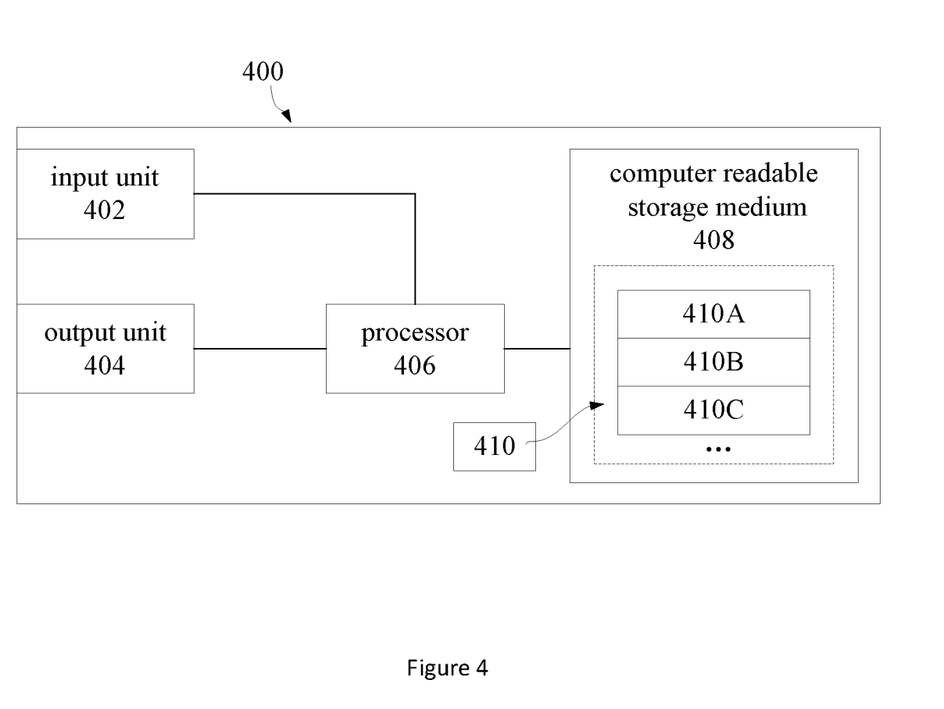
FIG. 4 is a block diagram showing an example hardware arrangement of an electronic apparatus for executing the method according to embodiments of the present disclosure.

According to a further embodiment of the present disclosure, an electronic apparatus is also provided, and FIG. 4 is a block diagram showing an exemplary hardware arrangement of the electronic apparatus 400. The electronic apparatus 400 includes a processor 406 (for example, a microprocessor (µP), a signal processor (DSP), etc.). The processor 406 may be a single processing unit or a plurality of processing units for performing the different actions of the method steps described herein. Electronic apparatus 400 may also include an input unit 402 for receiving signals from other entities and an output unit 404 for providing signals to other entities. The input unit 402 and the output unit 404 may be arranged as a single entity or as separate entities.

Furthermore, the electronic apparatus 400 may include at least one computer readable storage medium 408 having a non-volatile or volatile storage form, for example, an electrically erasable programmable read-only memory (EEPROM), a Flash memory and/or a hard disk. The computer readable storage medium 408 includes a computer program 410 including codes/computer readable instructions that, when executed by the processor 406 in the electronic apparatus 400, enable the electronic apparatus 400 to perform the above process described in conjunction with the above embodiments and any variations thereof.

The computer program 410 may be configured as computer program codes having architectures such as computer program modules 410A-410C. The computer program modules can substantially perform various actions in the processes described in the above embodiments to simulate a device. In other words, when different computer program modules are implemented in the processor 406, they may correspond to the above different units in the apparatus.

Although the code means in the embodiment disclosed in connection with FIG. 4 is implemented as a computer program module, and enable, when executed in the processor 406, the electronic apparatus 400 to perform the actions described above in connection with the above embodiments, in the alternative embodiment, at least one of the code means can be implemented at least partially as a hardware circuit.

The processor may be a single CPU (Central Processing Unit), or may also include two or more processing units. For example the processor may include a general purpose microprocessor, an instruction set processor and/or a related chipset and/or a dedicated microprocessor (for example, an application specific integrated circuit (ASIC)). The processor may also include an onboard memory for caching purposes. The computer program may be carried by a computer program product connected to the processor. The computer program product may include a computer readable medium having a computer program stored thereon. For example, the computer program product may be a flash memory, a random access memory (RAM), a read only memory (ROM) or EEPROM, and in an alternative embodiment, the above computer program modules may be distributed in the form of storages in different computer program products.

Although the present disclosure has been described in conjunction with the accompanying drawings, the embodiments disclosed in the accompanying drawings are intended to exemplify the preferred embodiment of the present disclosure, and shall not be construed as a limitation on the present disclosure.

Although some embodiments of the present disclosure have been shown and described, those skilled in the art will appreciate that changes can be made to these embodiments without departing from the principles and spirit of the present general inventive concept. The scope of the present disclosure is defined by the claims and their equivalents.

What is claimed is:

1. A method of identifying a Raman spectrogram, comprising:
   a measured spectrogram obtaining step: measuring a Raman spectrum of a substance to be detected so as to obtain a measured spectrogram, the measured spectrogram including a series of data;
   a peak information extraction step: extracting peak information of the measured spectrogram, the peak information including a peak intensity, a peak position and a peak area;
   a first identifying step: comparing the peak information of the measured spectrogram with peak information of a prestored standard spectrogram so as to identify whether or not the peak information of the measured spectrogram matches the peak information of the standard spectrogram; and
   a second identifying step: comparing, when identifying in the first identifying step that the peak information of the measured spectrogram matches the peak information of the standard spectrogram, data of the measured spectrogram with data of the prestored standard spectrogram, so as to further identify whether or not the measured spectrogram matches the standard spectrogram.

2. The method according to claim 1, wherein the first identifying step comprises:

an ordering step: ordering peaks of the measured spectrogram and peaks of the standard spectrogram in a descend order of a peak intensity respectively, so as to select first ordered N peaks of the measured spectrogram and the standard spectrogram;

a comparing step: comparing peak position information between the first ordered N peaks of the measured spectrogram and the standard spectrogram; and a first matching step: determining whether or not the peak information of the measured spectrogram matches the peak information of the standard spectrogram based on a comparison result obtained in the comparing step.

3. The method according to claim 2, wherein the comparing step comprises:

calculating absolute differences between peak position of each of the first ordered N peaks of the measured spectrogram and peak position of each of the first ordered N peaks of the standard spectrogram in order in accordance with the following formula (1):

$$pD=|p2[j].fPos-p1[i].fPos| \quad \text{formula (1),}$$

where, N is a predetermined number of compared peaks and is a natural number larger than or equal to 3;

i, j represent order numbers of ordered peaks of the standard spectrogram and the measured spectrogram respectively, and i and j are each an integer larger than or equal to 0 and smaller than or equal to N;

p1[i].fPos represents a peak position of the $i^{th}$ peak of the ordered peaks of the standard spectrogram;

p2[j].fPos represents a peak position of the $i^{th}$ peak of the ordered peaks of the measured spectrogram; and pD represents an absolute difference between peak positions.

4. The method according to claim 3, wherein the first matching step comprises:

determining that the peak information of the measured spectrogram matches the peak information of the standard spectrogram when the calculated absolute difference between the peak positions meets the following condition (1); and determining that the peak information of the measured spectrogram does not match the peak information of the standard spectrogram when the calculated absolute difference between the peak positions does not meet the following condition (1):

$$pD<p2[j].fWidth/3 \text{ and } pD<p1[i].fWidth/3 \quad \text{condition (1),}$$

where, p1[i].fWidth represents a peak width of the ordered $i^{th}$ peak of the standard spectrogram; and p2[j].fWidth represents a peak width of the ordered $j^{th}$ peak of the measured spectrogram.

5. The method according to claim 2, wherein the first identifying step further comprises:

a peak matching weight calculation step: establishing a penalty function in accordance with the following formula (2) so as to calculate a peak matching weight; and a second matching step: determining that the peak information of the measured spectrogram matches the peak information of the standard spectrogram when peak matching weight is larger than or equal to a weight threshold; and determining that the peak information of the measured spectrogram does not match the peak information of the standard spectrogram when peak matching weight is smaller than the weight threshold, $$h=(1-2*|j-i|/10)*(0.5/(i+1))*\exp(-pD*2/\min(p1[i].fWidth,p2[j].fWidth)) \quad \text{formula (2),}$$

where:

h represents a peak matching weight;

i, j represent order numbers of ordered peaks of the standard spectrogram and the measured spectrogram respectively, and i and j are each an integer larger than or equal to 0 and smaller than or equal to N;

N is a predetermined number of compared peaks and is a natural number larger than or equal to 3;

pD represents an absolute difference between peak positions;

p1[i].fWidth represents a peak width of the $i^{th}$ peak of the ordered peaks of the standard spectrogram; and p2[j].fWidth represents a peak width of the $i^{th}$ peak of the ordered peaks of the measured spectrogram.

6. The method according to claim 5, wherein the peak matching weight calculation step and the second matching step are performed when determining in the first matching step that the peak information of the measured spectrogram matches the peak information of the standard spectrogram.

7. The method according to claim 2, wherein N is a natural number larger than or equal to three and smaller than or equal to five.

8. The method according to claim 1, wherein the second identifying step comprises:

comparing in correlation between data of the measured and data of the prestored standard spectrogram.

9. The method according to claim 8, wherein the comparing in correlation between data of the measured and data of the prestored standard spectrogram comprises:

calculating a correlation coefficient between the data of the measured spectrogram and the data of the prestored standard spectrogram;

determining that the measured spectrogram matches the standard spectrogram when the calculated correlation coefficient is larger than or equal to a preset correlation threshold; and determining that the measured spectrogram does not matches the standard spectrogram when the calculated correlation coefficient is less than the preset correlation threshold.

10. The method according to claim 8, wherein the step of comparing in correlation between data of the measured and data of the prestored standard spectrogram is performed within a union section between peak areas of all of peaks of the measured spectrogram and the standard spectrogram.

11. The method according to claim 1, further comprises:

a normalization step: normalizing the measured spectrogram and the standard spectrogram;

wherein the normalization step is performed before the peak information extraction step.

12. An electronic apparatus, comprising:

a memory configured for storing executable instructions therein; and a processor configured to execute the executable instructions stored in the memory so as to perform the method of claim 1.

* * * * *